July 15, 1947.  G. A. MEYER  2,424,043

METHOD OF HARDENING METALLIC FILMS

Filed March 16, 1944

GERARD A. MEYER
Inventor

By *G. A. Ellestad*
*G. T. Smyth*
Attorneys

Patented July 15, 1947

2,424,043

UNITED STATES PATENT OFFICE 2,424,043

METHOD OF HARDENING METALLIC FILMS

Gerard A. Meyer, Gates, N. Y., assignor to Bausch & Lomb Optical Company, Rochester, N. Y., a corporation of New York Application March 16, 1944, Serial No. 526,791

3 Claims. (Cl. 117—62)

This invention relates to a method of hardening films produced in vacuo and is a continuation in part of my copending application, Serial No. 468,737, filed December 11, 1942.

It has long been known that metallic films can be formed in vacuo by thermal evaporation or sputtering processes and films so formed are coming into great use as reflectors particularly first surface reflectors. Many metallic films formed by such processes, however, are objectionable as they are easily scratched and are not as resistant to frictional wear as is desired in many uses of first surface reflectors. Furthermore, the adhesion between some metallic films so formed and the surfaces filmed is poor and the films are easily removed from the base surfaces.

The primary object of the present invention is to provide a method for treating films deposited by thermal evaporation or sputtering processes in vacuo to increase the durability of such films. Films treated in accordance with the present invention are substantially harder and are more efficient for a longer period of time than untreated films of the same metals formed by high vacuum processes.

In the now preferred manner of carrying out the method of the present invention, the body carrying the film is placed in an avacuable container intermediate a pair of electrodes preferably formed of a metal which will not sputter appreciably such as magnesium or an alloy rich in magnesium. The container is then at least partially evacuated and the coated surface of the body subjected to a high voltage current passed between the two electrodes. In the preferred embodiment of the method of the invention, the electrode adjacent the coated or filmed surface is formed with a surface similar in shape to and at least co-extensive with the surface being treated.

If desired, the filmed surface can be subjected to the discharge within the container in which the filming operation was carried on. If the discharge cycle of the method of the present invention is carried on in the same container in which the filming operation was completed, means must be provided for moving the electrodes into the desired position relative to the body after the surface thereof has been filmed.

Whether the discharge cycle is carried out in the same container in which the surface was filmed or a different container, after the discharge is discontinued the body is stored in a space in which the pressure is substantially less than that at which the discharge operation was carried out. The body is subjected to the low pressure for a period substantially equal to the period of the discharge cycle of the method and then removed from the container.

Although the film need not be treated immediately after its formation, in fact films may be stored for relative long periods of time before treatment, I have found that once the discharge cycle has been completed and the body removed from the discharge container, the same should be placed in the storage container as soon as possible.

Films treated in accordance with the present invention are considerably more durable than untreated films of the same metals for the treated films are harder and much more resistant to frictional wear. The adhesion between the films and the surfaces filmed is greatly improved and the films can withstand considerable frictional wear without stripping off the surface filmed. The method of the present invention not only greatly increases the durability of the films treated but does so without impairing the optical properties of the treated films and films treated by the present method form excellent first surface reflectors.

Other objects and advantages of the present invention will appear from the following description taken in connection with the accompanying drawing in which.

The method of the present invention is used for hardening films formed by evaporating or sputtering metallic materials in a vacuum. Films formed by thermal evaporation or sputtering processes are particularly adapted to be used as first surface reflectors. Many metallic materials, which may be deposited as a film and which possess certain physical properties such as resistance to corrosion and which form excellent reflecting surfaces, have not proven satisfactory as first surface reflectors for the reason that they are easily scratched and do not tenaciously adhere to the filmed surface.

This is particularly true of aluminum films formed by evaporating the metal in vacuo and sputtered films of rhodium. I have discovered that films of these metals when formed in vacuo may be rendered sufficiently hard when treated in accordance with the method herein disclosed to permit their use as first surface reflectors in many fields of use in which they could not previously be used.

Figure 1:
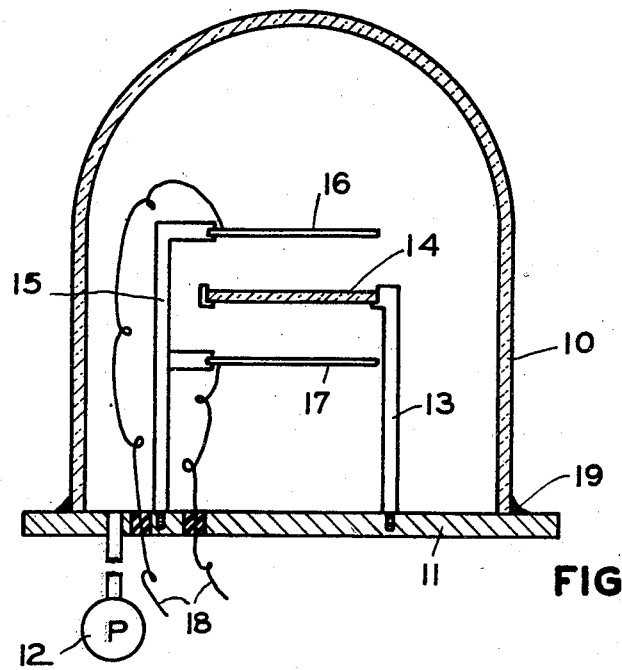
Fig. 1 is a sectional view partly in elevation of an apparatus for carrying out the discharge cycle of the method of the present invention.

There is shown in the drawing one form of the apparatus which may be used for carrying out the method of the present invention. The apparatus comprises, referring now to Fig. 1, an evacuable container such as the bell jar 10 supported on a suitable base plate 11 and connected to a high vacuum pump diagrammatically shown at 12. The base plate 11 carries a support 13 for mounting the body 14 having the filmed surface within the bell jar 10. The base plate 11 also carries a stanchion 15 which supports a pair of electrodes 16 and 17 connected to a source of high voltage current through leads 18 passed through the base plate 11 and insulated therefrom.

In the preferred embodiment of the method of the present invention, the body 14 is preferably placed in the support 13 in such a manner that the filmed surface faces the electrode 16. If one surface of the body has been coated, the electrodes 16 should be located in close proximity to the coated surface and should be formed with a surface corresponding to and of an area at least as great as the area of the surface coated. Where opposite surfaces of the body have been coated, each electrode should be mounted closely adjacent the surface coated and as in the case where but one surface was coated, each electrode should be shaped similar to and of an area approximating that of the surface coated.

After the body has been properly oriented on the support 13, the jointure between the lower edge of the bell jar 10 and the base plate 11 is sealed by means of a suitable sealing composition 19. The bell jar is thereafter evacuated until the pressure within same is brought down to within the range of 50 to 250 microns of mercury. I have found exceptionally good results are attained if the pressure is brought down and held at substantially 200 microns of mercury. A high voltage current is now passed between the two electrodes and the body left submerged in the discharge created for a length of time depending primarily on the current used to create the discharge. I have found that when a current of 35 to 40 milliamps at a voltage of at least 5,000 volts is used, the discharge should be continued for approximately one hour. Although the filmed surface can be subjected to the discharge for periods longer than an hour, I found that films, particularly of evaporated aluminum and sputtered rhodium, are not appreciably improved by increasing the duration of the discharge. The films are rendered more durable even when submerged in the discharge for relatively shorter periods of time although the best results were obtained when the discharge was continued for the period noted above.

The electrodes should be formed of a material which does not appreciably disintegrate or sputter by reason of the discharge. Although there are a number of metals which may be used to form the electrodes, I have found that my method is more efficient if the electrodes are formed of aluminum, magnesium, or a metal rich in magnesium. A number of magnesium-rich metals are procurable on the open market, and I have found that an alloy comprising 95% magnesium, 4% aluminum, and 0.3% manganese gives excellent results.

Although in the preferred embodiment of the present invention the discharge cycle is carried on within a container other than that in which the film was deposited, the cycle can be completed within the same container in which the film was deposited by arranging a pair of electrodes in this container in such a manner that they can be swung into proper position relative to the body and the coated surface or surfaces thereof.

Figure 2:
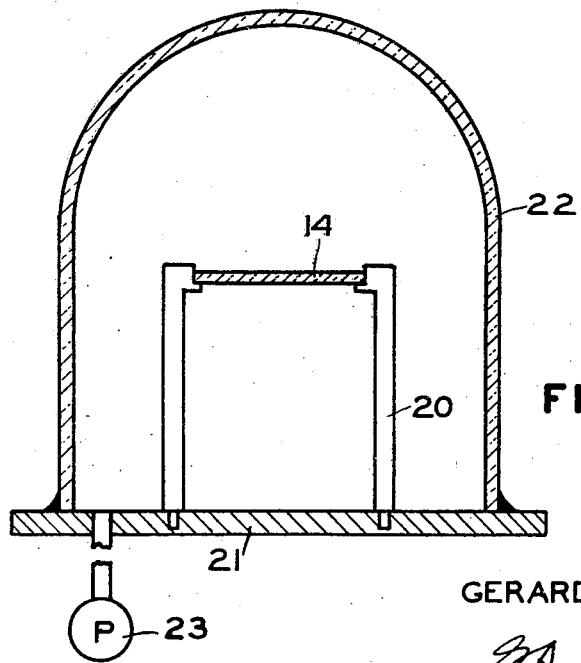
Fig. 2 is a view similar to Fig. 1 but showing an apparatus which may be used for storing a body having the filmed surface after the discharge cycle has been completed.

After the discharge is discontinued, the body may be removed from the bell jar 10 and referring now to Fig. 2, placed in a ring 20 carried by a base plate 21 supporting a container such as the bell jar 22. This container, after the joint between the lower edge of the same and the base plate has been sealed, should be pumped down by means of the pump mechanism diagrammatically shown at 23 until the pressure within the same is brought down to within a range of 0.1 to 0.01 of a micron of mercury. Exceptionally good results were obtained by holding the pressure within the bell jar 22 at substantially 0.04 micron of mercury during this step of the method. The body is allowed to remain in the evacuated container 22 for a period of time approximating the period of the discharge cycle after which the body is removed. This completes the method and the film is now ready for its intended use.

If desired, the discharge container can be used to complete the method by reducing the pressure therein to within the range indicated above at the conclusion of the discharge cycle, the body remaining therein under the reduced pressure for a period of a duration equal to that where the body is removed to container 20 to complete the method.

Metallic films, particularly aluminum and rhodium films, treated in accordance with the present invention, are harder than untreated films of the same metals deposited by identical processes. As films treated by the method herein disclosed are harder, they are more resistant to frictional wear and, therefore, are less apt to become scratched in use. The method of the present invention also greatly improves the adhesion between the film of the metal and the surface coated by the same. The treatment outlined above does not impair the optical properties of the films treated so that reflecting films treated in accordance with the present invention make excellent first surface reflectors.

The procedures above described have proved to be practical ways of carrying out the method of my invention, but I do not commit myself to the details of structure or method set forth, and it is to be understood that the invention is not limited to the preferred embodiments described but is susceptible of changes in form and detail within the scope of the appended claims.

I claim:

1. The method of treating a metallic film deposited on a surface of a body in vacuo to increase the durability of the film which comprises the steps of placing the body in an evacuable container with the filmed surface held substantially parallel to the surface of one of a pair of electrodes formed of a material which will not sputter appreciably; evacuating said container to a pressure of about 250–50 microns of mercury; subjecting the filmed surface to a discharge created in the partially evacuated container by a high voltage current passed between said electrodes; discontinuing said discharge after approximately one hour; and immediately thereafter subjecting said body for a period of time substantially equal to the duration of said discharge to storage in an ambient pressure of about 0.1–0.01 micron of mercury.

2. The method of treating metallic films deposited in vacuo to increase the durability of the same which comprises the steps of placing the filmed surface in close proximity to one of a pair of electrodes formed of a material which will not sputter appreciably in an evacuable container; reducing the pressure within said container to at least 250 microns of mercury but not less than 50 microns of mercury; subjecting the filmed surface to a discharge created by a high voltage current passed between said electrodes; removing said body to another evacuable container; reducing the pressure within said second container to at least 0.1 of a micron of mercury but not less than 0.01 of a micron of mercury; and storing said body within said second container for a period of time approximating one hour.

3. The method of increasing the durability of a metallic film deposited on a surface of a body in vacuo which comprises placing the filmed surface in a chamber adjacent one of a pair of electrodes formed of a material which does not sputter appreciably, evacuating the chamber to a pressure of about 50–250 microns of mercury, subjecting the filmed surface to an electrical discharge by applying a potential of about 5,000 volts to the electrodes for about one hour, and thereafter storing the body having the filmed surface for about one hour in a chamber having a pressure of about 0.1–0.01 micron of mercury.

GERARD A. MEYER.

REFERENCES CITED

The following references are of record in the file of this patent:

UNITED STATES PATENTS

| Number | Name | Date |
| --- | --- | --- |
| 2,322,613 | Alexander | June 22, 1943 |
| 2,067,907 | Edwards | Jan. 19, 1937 |